Patented July 16, 1935

2,008,360

UNITED STATES PATENT OFFICE 2,008,360

SYNCHRONOUS MACHINE

Jacob Lell, Heidenheim-on-the-Brenz, Germany

Application March 31, 1932, Serial No. 602,259

4 Claims. (Cl. 172—280)

This invention relates to synchronous alternating current machines of variable speed and purposes to attain this variability in the simplest manner, so that, regardless of the variability of the speed, the synchronous character of the machine is maintained.

Synchronous alternating current machines with variable speed are known to the art in which the direct current part includes a rotor having a collector in the form of a commutator with rotating brush holders upon which slip-rings are mounted by means of which the exciter current is fed to the field magnets, the windings of which are subdivided into individual coils the ends of which are connected to the collector in such a manner that with the rotating brush-holder, the poles are moved circumferentially around the collector, while the armature, in the usual manner, is connected to the alternating current circuit.

It is furthermore known that electrical synchronism requires synchronous speed of the brush-holder, and thus constructions are known to the art in which the brush-holder is rotated by a separate synchronous motor connected to the alternating current generator. One consequence of this mode of operation is, however, that the rotor may assume any speed whatever between zero and runaway speed, a condition unsuitable in practical operation.

It is the aim and purpose of this invention to operate the rotor with variable speed which, however, after the desired speed has been acquired, remains constant.

The invention will be further described in connection with the drawings and finally claimed in the appended claims.

Figure 1:
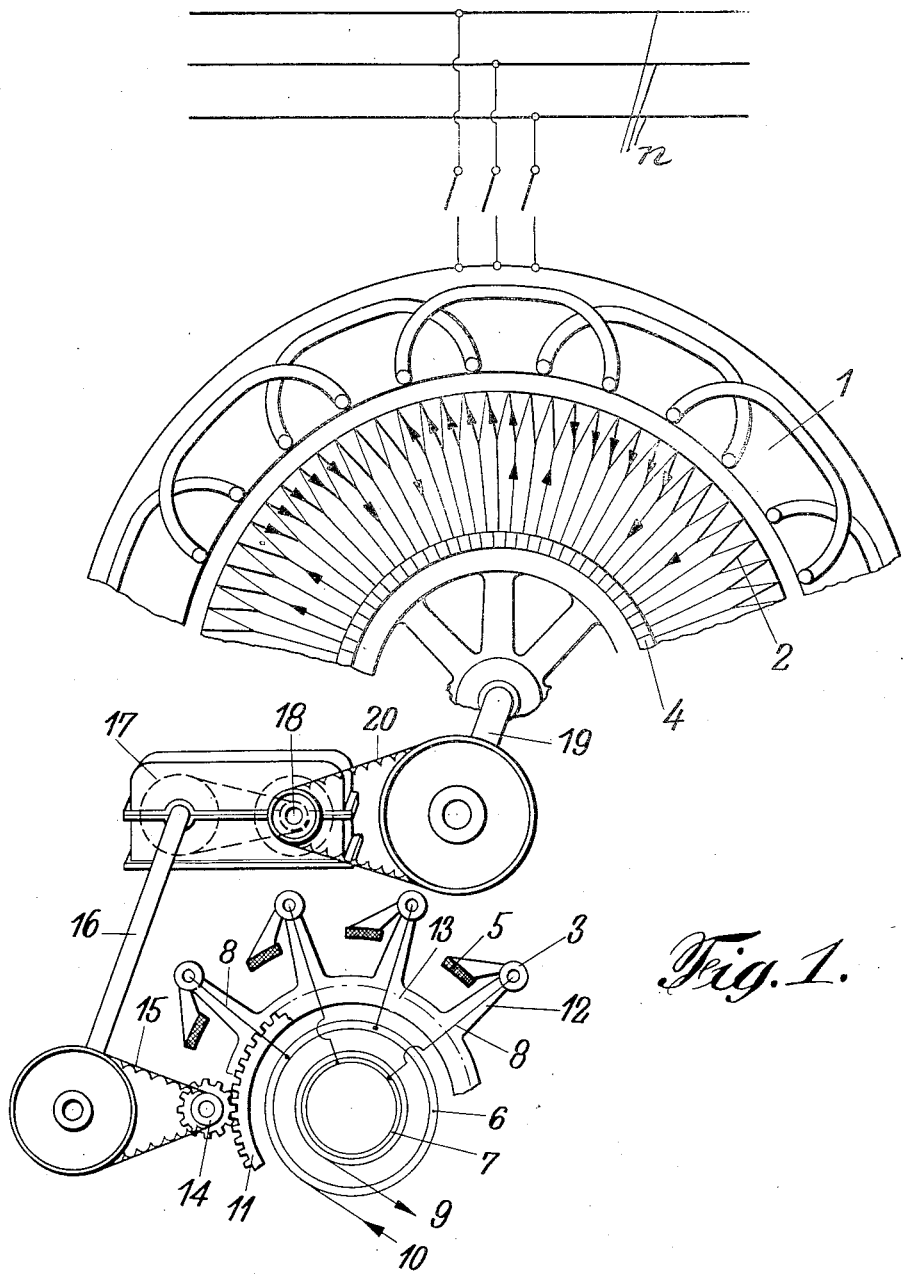
Figure 2:
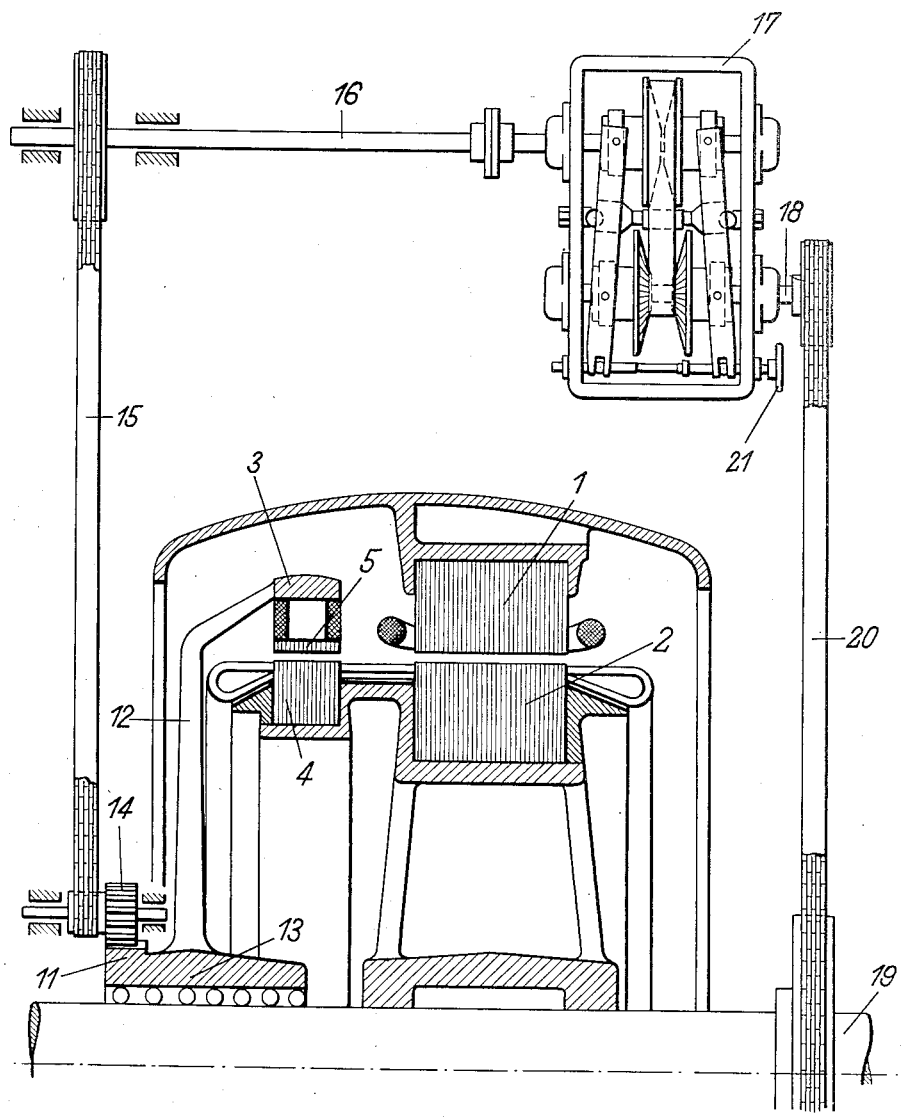

In the accompanying drawings wherein I have illustrated more or less diagrammatically one practical embodiment of the invention, Figure 1 is a fragmentary elevation, showing one embodiment of the machine; and Fig. 2 is a semi-diametrical sectional view illustrating more particularly one means which may be employed for driving the brush holder from the rotor at variable speeds.

1 is the armature of a synchronous machine, its winding being connected directly with the net comprising the supply lines n, 2 are the windings of the magnet rotor, 3 are the brush-holders, 4 is the collector to which the individual coils of the magnet wheel are connected, 5 are the brushes gliding upon the collector, 6 and 7 are the slip-rings by means of which direct current is led in to the magnet rotor 2 by way of connections 8, brushes 5 and collector 4. 9 and 10 are the feeders of direct current to the slip rings. 11 is a spur gear rigidly connected to the brushholder, arms 12 and ring 13. Meshing with this spur gear 11 is the pinion 14 of a variable speed mechanism which is geared to and rotated by the magnet rotor 2 so that by the proper adjustment of the variable speed mechanism a relative speed of the brush-holder, and ring 13 with respect to the magnet wheel 2, and collector 4 may be maintained.

In Fig. 2 of the drawings, I have illustrated one convenient means for obtaining this result wherein the pinion 14 is driven from shaft 16 by the belt or other driving connection 15. The shaft 16 is in turn driven by the change speed mechanism indicated generally at 17 which is of a conventional type and includes a primary shaft 18 driven by the belt connection 20 from the rotor shaft 19. The mechanism 17 is adjusted to change or vary the driving speed transmitted from shaft 18 to shaft 16 by means of the hand wheel indicated at 21. Therefore it will be evident that by means of such variable speed driving connections between the rotor and the brush holder, the synchronous operating character of the machine is maintained under all working conditions.

The magnet field windings of the rotor are in the form of a circumferential series of coils connected with the collector 4, the existing positions of the brushes 5, determining the instant positions of the magnet poles, which of course change with each variation in the speed of the revolution of the brush holder relative to the rotor.

If the gear ratio between the magnet rotor 2 and the brush holder ring 13 is, for instance, 1:1, there will be no relative speed between the brush holder and the collector and thus the machine would operate as a standard synchronous machine. If, however, the gear ratio between the magnet rotor and the brush holder is changed to any other value, then as long as the machine does not fall out of step due to over-loading, the brush holder will continue to rotate synchronously and the rotor speed up and down is defined by the gear ratio that may be adjusted between the magnetic rotor and brush-holder without stressing the gear more than what is required to overcome the normal frictional resistance of the brush-holder.

Having thus given a full and concise description of my invention what I claim is:

1. In a synchronous alternating current electric machine of the multipolar type including a stator having an alternating current winding connected in direct synchronism with the net, a rotor including a closed winding having a circumferential series of coils, a commutator to the segments of which said coils are respectively connected, a relatively rotatable brush-holder having a series of circumferentially spaced brushes in sliding contact with the segments of the commutator, means for supplying said brushes with direct current, and means for driving said brush-holder from the rotor at predetermined variable speeds relative to the speed of rotation of the rotor and synchronously in step with the net, whereby to vary the speed of the rotor.

2. In a synchronous alternating current electric machine of the multipolar type including a stator having an alternating current winding connected in direct synchronism with the net, a rotor including a closed winding having a circumferential series of coils, a commutator to the segments of which said coils are respectively connected, a relatively rotatable brush-holder having a series of circumferentially spaced brushes in sliding contact with the segments of the commutator, slip rings mounted upon the brush-holder, connections for transmitting direct current from said slip rings to the brushes, means for supplying the slip rings with direct current, and means for driving said brush-holder from the rotor at predetermined variable speeds relative to the speed of the rotation of the rotor, said means being effective for regulation at will for operating said brush-holders synchronously in step with the net.

3. In a synchronous alternating current electric machine including a stator having an alternating current winding connected directly with the net, a rotor including a closed winding having a circumferential series of coils, a commutator, said coils being connected respectively to the segments of said commutator, and a rotatable brush holder having a plurality of circumferentially spaced brushes in sliding contact with the segments of the commutator, the combination of slip rings carried by the brush holder, said slip rings being connected respectively with said brushes, means for supplying the slip rings with direct current, power transmission means between the rotor and said rotatable brush holder for rotating the latter from said rotor, said power transmission means including a speed change device whereby to relatively vary the speed of rotation of the brush holder with respect to the speed of rotation of the rotor.

4. In a device of the character described which includes a stator with an alternating current winding connected in direct synchronism with the net, a rotor and its closed winding having a circumferential series of coils, a commutator the segments of which are connected respectively with said coils and a rotatable brush-holder provided with a plurality of circumferentially spaced brushes having sliding contact with said segments of the commutator; slip rings carried by the brush-holder and electrically connected respectively with said brushes, means for supplying the slip rings with direct current, power transmission means connecting the brush-holder with the rotor whereby to operate the former from the operation of the rotor, and including a change-speed device which is operative to relatively vary the speed of rotation of the brush-holder with respect to the speed of rotation of the rotor, and means for regulating said device at will so that irrespective of speed changes in the rotor the brush-holder can be operated to rotate synchronously in step with the net.

JACOB LELL.